US008612185B2

(12) United States Patent
Cho et al.

(10) Patent No.: US 8,612,185 B2
(45) Date of Patent: Dec. 17, 2013

(54) DEVICE, SYSTEM AND METHOD FOR SIMULATING AND SAVING INFORMATION OF METADATA REGARDING FILM PRODUCTION

(75) Inventors: Maeng Sub Cho, Daejeon (KR); Jin Seo Kim, Daejeon (KR); Ki Hong Kim, Daejeon (KR); Ju Yeon You, Daegu (KR); Soon Young Kwon, Daegu (KR); Song Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 558 days.

(21) Appl. No.: 12/904,759

(22) Filed: Oct. 14, 2010

(65) Prior Publication Data

US 2011/0093248 A1 Apr. 21, 2011

(30) Foreign Application Priority Data

Oct. 15, 2009 (KR) .......................... 10-2009-0098321
Apr. 14, 2010 (KR) .......................... 10-2010-0034427

(51) Int. Cl.
*G06F 17/50* (2006.01)

(52) U.S. Cl.
USPC ................... 703/2; 703/6; 345/207; 348/239; 382/154

(58) Field of Classification Search
USPC ............ 703/2, 6; 348/239; 382/154; 345/207
See application file for complete search history.

(56) References Cited

U.S. PATENT DOCUMENTS

| 5,831,673 | A  | * | 11/1998 | Przyborski et al. | ........... 348/239 |
|---|---|---|---|---|---|
| 6,459,425 | B1 | * | 10/2002 | Holub et al. | .................. 345/207 |
| 7,075,643 | B2 | * | 7/2006 | Holub | ........................ 356/326 |
| 7,697,750 | B2 | * | 4/2010 | Simmons | ...................... 382/154 |
| 7,710,560 | B2 | * | 5/2010 | Holub | ........................ 356/300 |
| 7,728,845 | B2 | * | 6/2010 | Holub | ........................ 345/589 |
| 2003/0020703 | A1 | * | 1/2003 | Holub | ........................ 345/207 |
| 2005/0053274 | A1 | * | 3/2005 | Mayer et al. | .................. 382/154 |
| 2006/0197757 | A1 | * | 9/2006 | Holub | ........................ 345/207 |
| 2006/0239586 | A1 |   | 10/2006 | Mowry | |
| 2006/0244907 | A1 | * | 11/2006 | Simmons | ...................... 351/162 |
| 2010/0231728 | A1 | * | 9/2010 | Holub | ........................ 348/207.2 |
| 2010/0289835 | A1 | * | 11/2010 | Holub | ........................ 345/690 |

FOREIGN PATENT DOCUMENTS

| JP | 2007-323516 A | 12/2007 |
|---|---|---|
| KR | 1020050012101 A | 1/2005 |
| KR | 10-2008-0016571 A | 2/2008 |
| KR | 1020080018403 A | 2/2008 |

* cited by examiner

*Primary Examiner* — Thai Phan

(57) ABSTRACT

The present invention relates to a device, a system, and a method for simulating and saving information of metadata regarding film production. According to the present invention, it can store and manage a variety of information generated from the production location or the pre-production process and share the information by all staffs participating in the production, thereby making it possible to accurately record the information and smoothly communicate between the staffs.

20 Claims, 4 Drawing Sheets

DEVICE, SYSTEM AND METHOD FOR SIMULATING AND SAVING INFORMATION OF METADATA REGARDING FILM PRODUCTION

CROSS-REFERENCE TO RELATED APPLICATIONS

This application claims priority under 35 U.S.C. §119 to Korean Patent Application No. 10-2009-0098321, filed on Oct. 15, 2009, and Korean Patent Application No. 10-2010-0034427, filed on Apr. 14, 2010, in the Korean Intellectual Property Office, the disclosure of which is incorporated herein by reference in its entirety.

BACKGROUND OF THE INVENTION

1. Field of the Invention

The present invention relates to a device, a system, and a method for simulating and saving information of metadata regarding film production, and more particularly, to a device, a system, and a method for simulating and saving information of metadata regarding film production capable of storing and managing a variety of production information, sharing the information by staffs of the production location, performing an editing work, etc., using the corresponding information at post-production, and performing various simulations based on the information at the time of the production.

2. Description of the Related Art

In the related art, a specific expert (scripter) handwrites a variety of information generated from production location at the time of the production, such that it is difficult to accurately record the information. In other words, many people participating in the production should share information generated from various situations at the time of actually performing the production; however, it is difficult to accurately record the information and share the written contents. Furthermore, at a post-production process such as editing, CG, and color correction, it is difficult to confirm exact information at the time of the production and when the post-production and the production are simultaneously performed, handwriting is very inefficient.

Meanwhile, thousands of filters such as a lighting filter, a camera filter, are used for the production and the final result is significantly different according to the selection of the filter. However, the filter is selected based only on the experience of staffs such as a lighting director, a movie director, which causes differences between desired scenes and filmed scenes.

SUMMARY OF THE INVENTION

An object of the present invention is to provide a device, a system, and a method for simulating and saving information of metadata regarding film production capable of storing and managing various production information, sharing the information with staffs at the production location, performing an editing work, etc., using the corresponding information at post-production. It is another object of the present invention to provide a device, a system, and a method for simulating and saving information of metadata regarding film production capable of predicting final result by previously performing various simulations prior to the production so as to perform the production.

In order to achieve the above-mentioned objects, according to an aspect of the present invention, there is provided a method for storing and simulating information regarding film production, including: receiving, by a device, production information of at least one of date, time, location, film roll number, scene number, cut number, film, lens, filter, continuity, lighting position, camera position, acoustic effect, costume, make up, prop, NG information, required time, action, and dialogue; performing, by the device, simulations for at least one of final result, lighting effect, a camera filter, a lighting filter, and a view according to a focal distance of the camera lens based on the received information; and displaying, by the device, at least one of the received information and the simulation result.

According to an another aspect of the present invention, there is provided a method for storing and simulating information regarding film production provided by a device for storing and simulating information regarding film production and a server for synchronizing information regarding film production, including (a) receiving, by the server, production information including at least one of date, time, location, film roll number, scene number, cut number, film, lens, filter, continuity, lighting position, camera position, acoustic effect, costume, make up, prop, NG information, required time, action, and dialogue; (b) storing, by the server, the received information; (c) requesting a search to the server from the device; (d) reading out, by the server, the corresponding information from information stored at step (b) according to the search request of the device; (e) transmitting, by the server, the read out information to the device; (f) performing, by the device, simulations for at least one of final result, lighting effect, a camera filter, a lighting filter, and a view according to a focal distance of the camera lens based on the information received at step (e); and (g) displaying, by the device, at least one of the information received at step (e) and simulation result of step (f).

According to a yet another aspect of the present invention, there is provided a device for storing and simulating information regarding film production, including: a receiver that receives production information including at least one of date, time, location, film roll number, scene number, cut number, film, lens, filter, continuity, lighting position, camera position, acoustic effect, costume, make up, prop, NG information, required time, action, and dialogue; a simulator that performs simulations for at least one of the final result, lighting effect, a camera filter, a lighting filter, and a view according to a focal distance of the camera lens based on the received information; and a display unit that displays at least one of the information received in the receiver and the simulation result.

According to an another aspect of the present invention, there is provided a system for storing and simulating information regarding film production including a device for storing and simulating information regarding film information and a server for synchronizing information regarding film production, wherein the device includes: a receiver that receives production information including at least one of date, time, location, film roll number, scene number, cut number, film, lens, filter, continuity, lighting position, camera position, acoustic effect, costume, make up, prop, NG information, required time, action, and dialogue; a simulator that performs simulations for at least one of final result, lighting effect, a camera filter, a lighting filter, and a view according to a focal distance of the camera lens based on the received information; a display unit that displays at least one of the information received in the receiver and the simulation result, and a transmitter that transmits at least one of the information received in the receiver and the simulation result of the simulator; and the server includes: an input unit that receives information transmitted from the transmitter of the device; a storage unit that stores the information received in the input, unit; a controller that reads out the latest information from the storage unit when a predetermined time elapses; and an output unit that transmits the read out information to the device.

DETAILED DESCRIPTION OF THE PREFERRED EMBODIMENTS

Advantages and features of the present invention and methods to achieve them will be elucidated from exemplary embodiments described below in detail with reference to the accompanying drawings. However, the present invention is not limited to exemplary embodiment disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Meanwhile, terms used in the present invention are to explain exemplary embodiments rather than limiting the present invention. In the specification, a singular type may also be used as a plural type unless stated specifically. "comprises" and/or "comprising" used herein does not exclude the existence or addition of one or more other components, steps, operations and/or elements. In addition, the detailed description of a related known function or configuration that may make the purpose of the present invention unnecessarily ambiguous in describing the present invention will be omitted.

Figure 1:
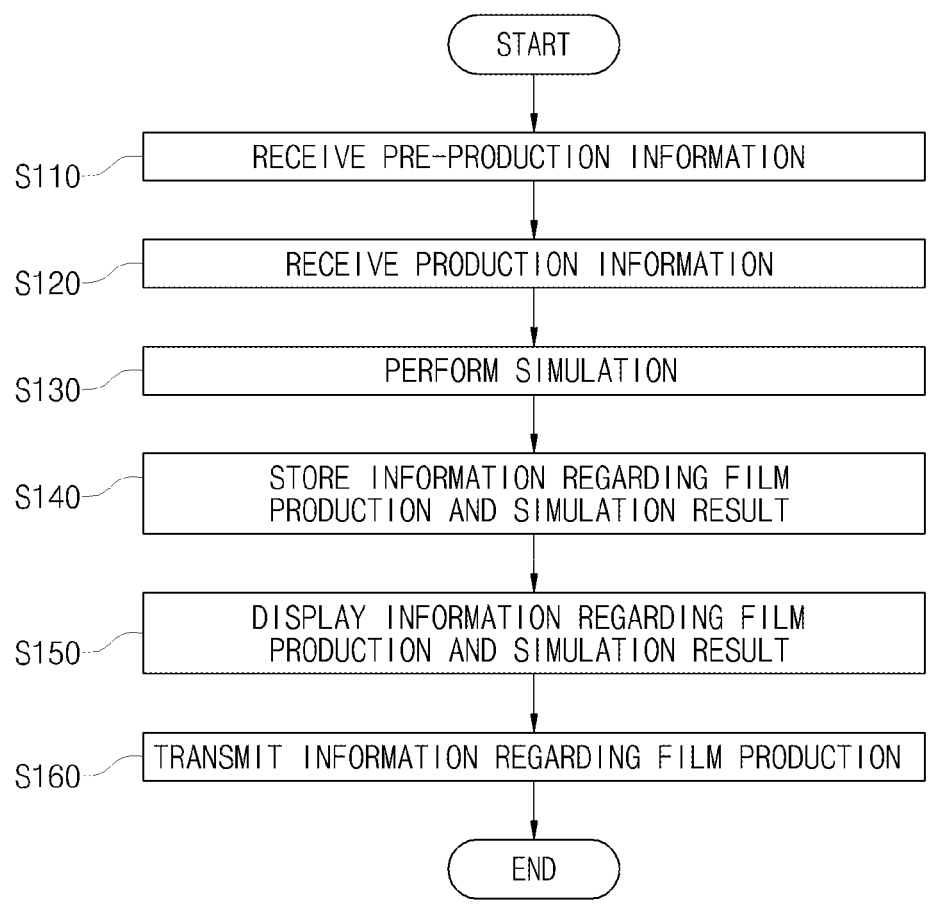
FIG. 1 is a block diagram showing a method for storing and simulating information of metadata regarding film production.

FIG. 1 is a block diagram showing a method for storing and simulating information of metadata regarding film production.

Referring to FIG. 1, in a method for storing and simulating information of metadata regarding film production, a device 100 receives production information (S120). In addition, it may further receive information at a pre-production process prior to receiving the production information. As the production information, there may be date, time, location, film roll number, scene number, cut number, film, lens, filter, continuity, lighting position, camera position, acoustic effect, costume, make up, prop, NG information, required time, action, dialogue, and so on. The pre-production information may include all information necessary to produce a movie such as production location, liaison, sunrise/sunset time, movement flow, camera view, and so on.

Next, the device 100 performs simulations for at least one of final result, lighting effect, a camera filter, a lighting filter, and a view according to a focal distance of the camera lens based on the information (S130). When the focal distance of the camera lens is changed according to result relating to the position of lighting, etc., result according to an ND filter, a UV filter, a diffusing filter, a Fog filter, and a Star filter, etc., result according to several a lighting filters such as a diffusion filter, a color temperature converting filter, and a color filter, etc., through the device 100 at the actual production location, the final result are previously determined when the result according to the changed focal distance and each result are applied and thus, the determined final result are provided to a movie director, a lighting director, a producer, etc. Therefore, lighting, filter, view, etc., that meet the scene to be produced at the actual production location prior to production can be selected by a producer, etc.

Next, the device 100 stores at least one of the received information and the simulation result (S140). The device 100 may convert the information into the input format of the existing commercial program and store it when storing the information. In other words, it may be changed and stored the information so that it can be plugged-in in the existing commercial program used in the photo shop or the post-production.

Next, the device 100 stores at least one of the received information and the simulation result (S150). Participants of the production confirm the information or the result, thereby making it possible to share the information and previously confirm the produced result.

Next, the device 100 transmits at least one of the received information and the simulation result (S160). The device 100 may transmit information to a server 200 for synchronizing information of metadata regarding film production or other devices 100.

Figure 2:
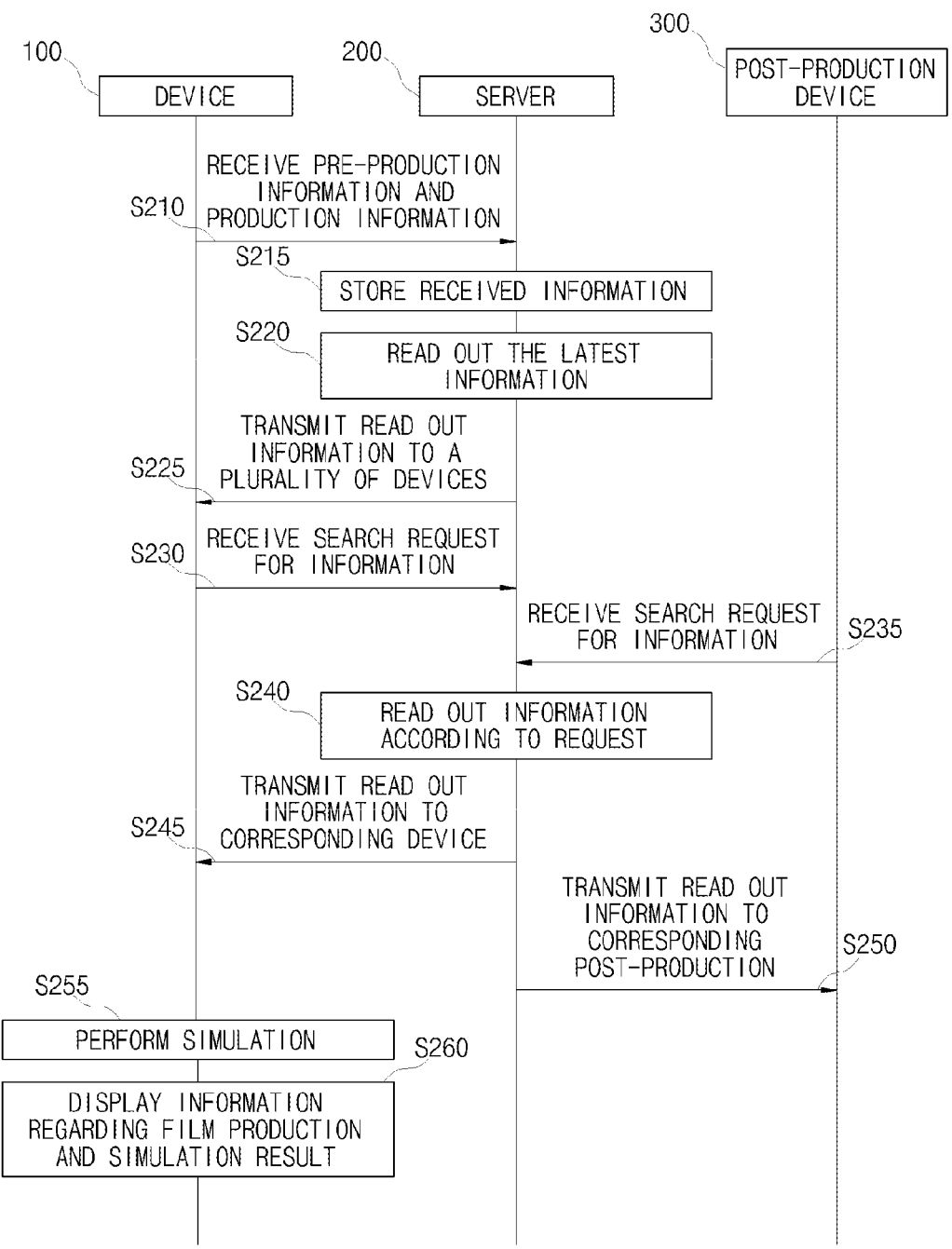
FIG. 2 is a block diagram showing a method for storing and simulating information of metadata regarding film production including a device for storing and simulating information of metadata regarding film production and a server for synchronizing information of metadata regarding film production.

FIG. 2 is a block diagram showing a method for storing and simulating information of metadata regarding film production including a device for storing and simulating information of metadata regarding film production and a server for synchronizing information of metadata regarding film production.

Referring to FIG. 2, in a method for storing and simulating information of metadata regarding film production including the device 100 for storing and simulating information of metadata regarding film production according to the present invention and the server 200 for synchronizing information of metadata regarding film production, the server 200 receives information regarding film production (S210). Further, the server 200 may further receive the pre-production information. The server 200 may receive information that is input to several devices 100 or is directly input to the server 200 by the user. The production information and the pre-production information were already described above.

Next, the server 200 stores the received information (S215). The server 200 may change and store the information in a format in which the information can be plugged-in into an existing commercial program such as the Photoshop or the Post-production.

Next, the server 200 may provide the information stored in the server according the request from the device 100 or a post-production device 300. In other words, the server 200 requests the search for the information from one or more devices 100 (S230).

Next, the server 200 reads out the corresponding information from the stored information according to the request (S240) and transmits it to the corresponding device 100 (S245). The server 200 reads out and transmits the information according to the request of the device 100, such that the plurality of devices 100 can share the information of metadata regarding production and the information of metadata regarding production between several devices 100 can be synchronized.

The device 100 performs simulation on at least one of the final result, the lighting effect, the camera filter, the lighting filter, and the view according to the focal distance of the camera lens (S255). The detailed description thereof was already described above.

Next, the device 100 displays at least one of the received information and the simulation result (S260). As described above, the device 100 provides the information of metadata regarding production and the simulation result to staffs, a creator, a producer, and a movie director such that the communication and decisions between the workers at the production location can be smoothly made.

Meanwhile, the server 200 reads out the latest information when the predetermined time previously defined by the user elapses (S220). For example, it is assumed that the starting time is 9 am, the user defines 10 minutes as a predetermined time, information is received from (A) device 100 at 9:2 in the morning, and information is received from (B) device 100 at 9:7 in the morning. At this time, the server 200 may read out the information received (B) device 100 at 9:7 in the morning, which is the latest information, at a predetermined time, that is, at 9:10 after 10 minutes elapses from the starting time.

Next, the server 200 transmits the read out information to the plurality of devices 100 (S225). As described above, the devices 100 can share the latest information and the information regarding film production between the devices 100 can be synchronized by reading out the latest information and transmitting the information to several devices 100.

Next, the server 200 requests the search for the information from the post-production device 300 (S235).

Then, the server 200 reads out the corresponding information from the stored information according to the request of the post-production device 300 (S240).

Next, the server 200 transmits the read out information to the post-production device 300, thereby making it possible to use the information regarding film production and the pre-production information at the post-production (S250). That is, it provides the information regarding film production at the post-production including the editing, the CG, and the color correction thereby making it possible to the convenience of communication and the information regarding film production can be synchronized by reading out the latest information. For example, the time, lighting, color tone of one scene may not conform due to the production several times. At this time, information may be revised to be the same as the desired scenes at the production location, such that it is possible to obtain the desired image without performing the reproduction and the supplementary production. In addition, when the post-production is put out to several companies, it can reduce the inconsistency between companies by performing the work using the information regarding film production at several companies.

Figure 3:
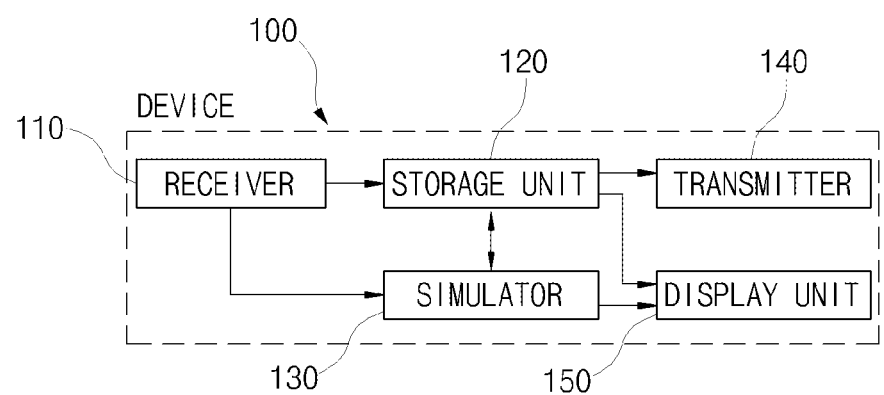
FIG. 3 is a configuration diagram showing a device for storing and simulating information of metadata regarding film production.

FIG. 3 is a configuration diagram showing a device for storing and simulating information of metadata regarding film production.

Referring to FIG. 3, the device 100 for storing and simulating the production information according to the present invention includes a receiver 110, a storage unit 120, a simulator 130, a display unit 150, and a transmitter 140.

The receiver 110 receives information generated at the time of the production. As the information regarding film production location, there may be date, time, location, film roll number, scene number, cut number, film, lens, filter, continuity, lighting position, camera position, acoustic effect, costume, make up, prop, NG information, required time, action, dialogue, and so on.

The simulator 130 performs simulation on final result, lighting effect, a camera filter, a lighting filter, and view according to a focal distance of the camera lens based on the information. When the focal distance of the camera lens is changed according to result according to the position of lighting result according to an ND filter, a UV filter, a diffusing filter, a Fog filter, and a Star filter result according to several a lighting filters such as a diffusion filter, a color temperature converting filter, and a color filter through the device 100 in the actual production location, the final result are previously determined when the result according to the changed focal distance and each result are applied and thus, the determined final result are provided to a movie director, a lighting director, a producer. Therefore, lighting, filter, view can be selected prior to production by a producer considering the scene to be produced in the actual production location.

The display unit 150 displays the production information received in the receiver 110 and the simulation result of the simulator 130 and displays them to a movie director, a lighting direction, a producer, etc.

The storage unit 120 stores the information received in the receiver 110. The information may store the information into an input format of the existing commercial program when storing the information.

In other words, the information may be changed and stored into the input data format so that it can be plugged-in in the existing commercial program used in the photo shop or the post-production.

The transmitter 140 is transmitted in order to transmit the information received in the receiver 110 to other devices 100, etc.

The receiver 110 further receives the pre-production information and the storage unit 120 further stores the pre-information. In other words, it receives and stores the pre-information at the movie-producing pre-production. The pre-information may include all hunting information necessary to produce a movie such as production location, liaison, sunrise/sunset time, movement flow, camera view, and so on. The pre-information is provided to staffs, a creator, a producer, a movie direction, etc. through a device 100, such that the communication and decisions can be smoothly made.

Figure 4:
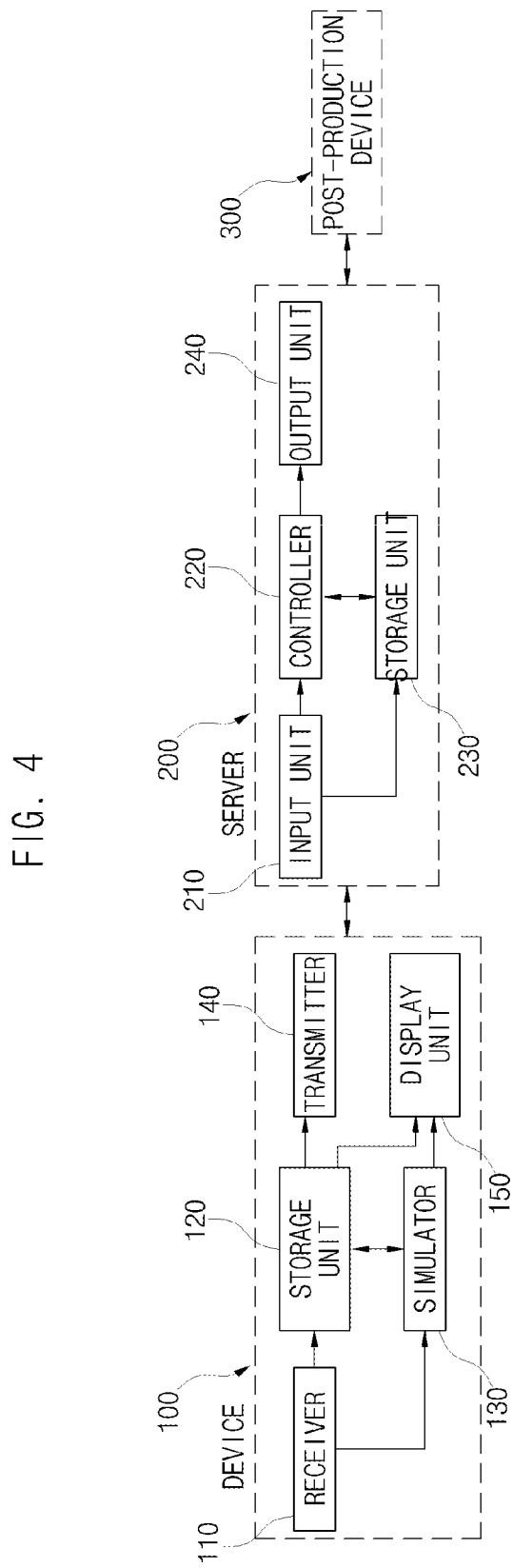
FIG. 4 is a configuration diagram showing a system for storing and simulating information of metadata regarding film production.

FIG. 4 is a configuration diagram showing a system for storing and simulating information of metadata regarding film production.

Referring to FIG. 4, the system for storing and simulating information regarding film production includes the device 100 that stores the information regarding film production and performs the simulation and the server 200 that synchronizes the information regarding film production between several devices 100.

The device 100 includes the receiver 110, the storage unit 120, the simulator 130, the transmitter 140, and the display unit 150. The receiver 110 receives the production information and the pre-production information of at least one of date, time, location, film roll number, scene number, cut number, film, lens, filter, continuity, lighting position, camera position, acoustic effect, costume, make up, prop, NG information, required time, action, dialogue, and so on. The information regarding film production may be received from the server 200 and the user may receive the information directly input through the device 100.

The storage unit 120 stores the information received in the receiver 110. The storage unit 120 may store the information in a format in which the information can be plugged into an existing commercial program such as the Photoshop or the Post-production.

The simulator 130 performs simulation on final result, lighting effect, a camera filter, a lighting filter, and view according to a focal distance of the camera lens, etc., based on the received information. The more detailed description was already described above.

The display unit 150 displays at least one of the received information and the simulation result.

The transmitter 140 transmits at least one of the received information and the simulation result to the server 200 or other devices 100.

The server 200 includes an input unit 210, a storage unit 230, a controller 220, and an output unit 240. The input unit 210 receives the information of at least one of the information regarding film production and the pre-production information. The information may be received from the direct input through the server 200 by several devices 100 or the user.

The storage unit 230 stores the information received in the receiver 210. The storage unit 230 may store the information in a format in which the information can be plugged into an existing commercial program such as the Photoshop or the Post-production. The stored information is used to synchronize the information regarding film production between several devices 100.

The controller 220 reads out the latest information from the storage unit 230 when the predetermined time previously defined by the user elapses. The detailed description was already described above.

The output unit 240 transmits the read out information to the plurality of devices 100, such that the information on several devices 100 is automatically updated to the latest information. In addition, it can synchronize information between the plurality of devices 100.

The input unit 210 further receives the search request for the information regarding film production from one or two devices 100.

The controller 220 reads out the corresponding information from the storage unit 230 according to the request of each device 100.

The output unit 240 transmits the read out information to the corresponding device 100 to update the information on the corresponding device 100 to the latest information and synchronize the information between the plurality of devices 100.

The input unit 210 further receives the search request for the information regarding film production from the post-production device 300.

The controller 220 reads out the corresponding information from the storage unit 230 according to the request of the post-production device 300.

The output unit 240 transmits the read out information to the post-production device 300, such that the information regarding film production and the pre-production information can be used in the post-production. That is, it provides the information regarding production at the post-production including the editing, the CG, and the color correction, etc., thereby making it possible to the convenience of communication and the information regarding film production can be synchronized by reading out the latest information.

The input unit 210 further receives the pre-production information.

The storage unit 230 further stores the pre-production information.

The server 200 performs simulation on at least one of final result, lighting effect, a camera filter, a lighting filter, and view according to a focal distance of the camera lens, etc., based on the information received in the input unit 210. The detailed description was already described above. At this time, when requesting the search for the simulation result to one or more device 100, the result obtained after performing the simulation in the simulator of the server 200 can be transmitted to the corresponding device 100. Therefore, it can perform the simulation that is difficult and complicated to perform in the device 100.

According to an exemplary embodiment of the present invention, it can store and manage a variety of information generated from the production location or the pre-production process and share the information with all the staffs participating in the production, thereby making it possible to accurately record the information and smoothly communicate between the staffs. Further, the present invention uses the information at the post-production work to revise the information to be the same as a fired scenes at the production location at the time of performing the works such as editing, CG, color correction, etc., such that it is possible to obtain the desired image without performing the reproduction and the supplementary production, thereby making it possible to save time and costs for the post-production and education.

Although preferred embodiments of the present invention have been illustrated and described, the present invention is not limited to the above-mentioned embodiments and various modifications can be made by those skilled in the art without the scope of the appended claims of the present invention. In addition, these modified embodiments should not be appreciated separately from technical spirits or prospects.

What is claimed is:

1. A method for storing and simulating information regarding film production, comprising:
    receiving a film production metadata information including at least one of a film production date, a film production time, a film production location, a film production roll number, a film production scene number, a film production cut number, a camera lens, a camera filter, a lighting filter, a film production lighting position, a film production camera position, a film production costume, a film production make-up and a film production prop;
    performing a simulation for at least one of a lighting effect, a camera filter, a lighting filter, and a focal distance of a camera lens based on the received film production metadata information; and
    displaying a result of the simulation, the received film production metadata information, and the lighting effect, the camera filter, the lighting filter, and the focal distance of the camera lens used in the simulation.

2. The method according to claim 1, further comprising storing in a device the received film production metadata information and the result of the simulation.

3. The method according to claim 2, wherein the device stores the received film production metadata information in a format for plugging-in to an existing program.

4. The method according to claim 1, further comprising transmitting, by the device, the received film production metadata information and the result of the simulation.

5. The method according to claim 1, further includes receiving, by the device, a pre-production information.

6. A method for storing and simulating information regarding film production provided by a device for storing and simulating information regarding film production and a server for synchronizing information regarding film production, comprising:
    sending, for storing by the server, a film production metadata information including of at least one of a film production date, a film production time, a film production location, a film production roll number, a film production scene number, a film production cut number, a camera lens, a camera filter, a lighting filter, a film production lighting position, a film production camera position, a film production costume, a film production make-up, and a film production prop;
sending a request for a search for film production metadata information to the server;
receiving the requested film production metadata-information;
performing, by the device, a simulation for at least one of a lighting effect, a camera filter, a lighting filter, and a focal distance of a camera lens based on the received film production metadata information; and
displaying, by the device, a result of the simulation, the received film production metadata information, and the lighting effect, the camera filter, the lighting filter, and the focal distance of the camera lens used in the simulation.

7. The method according to claim 6, further comprising receiving current film production metadata information a predetermined amount of time passes after a start time.

8. The method according to claim 6, further comprising:
requesting a search for film production metadata information to the server from a post-production device;
receiving the requested film production metadata information by the post-production device.

9. The method according to claim 6, further comprising sending, to the server, pre-production information.

10. The method according to claim 6, wherein the server stores the received film production metadata information in a format for plugging-in to an existing program.

11. A device for storing and simulating information regarding film production, comprising:
a receiver that receives a film production metadata information including at least one of a film production date, a film production time, a film production location, a film production roll number, a film production scene number, a film production cut number, a camera lens, a camera filter, a lighting filter, a film production lighting position, a film production camera position, a film production costume, a film production make-up, and a film production prop;
a simulator that performs a simulations for at least one of a lighting effect, a camera filter, a lighting filter, and a focal distance of a camera lens based on the received film production metadata information; and
a display unit that displays a result of the simulation, the received film production metadata information, and the lighting effect, the camera filter, the lighting filter, and the focal distance of the camera lens used in the simulation.

12. The device according to claim 11, further comprising a storage unit that stores the received film production metadata information and the result of the simulation.

13. The device according to claim 11, further comprising a transmitter that transmits the received film production metadata information and the result of the simulation.

14. The device according to claim 12, wherein the storing unit stores the received film production metadata information in a format for plugging-in to an existing program.

15. The device according to claim 11, wherein the receiver further receives a pre-production information.

16. A system for storing and simulating information regarding film production including a device for storing and simulating information regarding film production information and a server for synchronizing information regarding film production, comprising:
a device including
a receiver that receives a film production metadata information including at least one of a film production date, a film production time, a film production location, a film production roll number, a film production scene number, a film production cut number, a camera lens, a camera filter, a lighting filter, a film production lighting position, a film production camera position, a film production costume, a film production make-up, and a film production prop;
a simulator that performs a simulations for at least one of a lighting effect, a camera filter, a lighting filter, and a focal distance of a camera lens based on the received film production metadata information;
a display unit that displays a result of the simulation, the received film production metadata information, and the lighting effect, the camera filter, the lighting filter, and the focal distance of the camera lens used in the simulation; and
a transmitter that transmits the received film production metadata information and the result of the simulation; and
a server including:
an input unit that receives film production metadata information;
a storage unit that stores the film production metadata information received in the input unit;
a controller that reads out a current film production metadata information from the storage unit when a predetermined amount of time passes after a start time; and
an output unit that transmits the current film production metadata information to the device.

17. The system for storing and simulating information regarding film production according to claim 16, wherein
the input unit of the server further receives a search request for film production metadata information from the device; and
the controller of the server acquires corresponding information from the storage unit in response to the request of the device.

18. The system for storing and simulating information regarding film production according to claim 16, wherein
the input unit of the server further receives a search request for film production metadata information from a post-production device, and
the controller of the server acquires corresponding information from the storage unit in response to the request of the post-production device, and
the output unit of the server transmits the acquired information to the post-production device.

19. The system according to claim 16, wherein the input unit of the server further receives a pre-production information.

20. The system according to claim 16, wherein the storage unit of the server stores the film production metadata information in a format for plugging-in to an existing program.

* * * * *